United States Patent [19]
Klein

[11] 4,327,414
[45] Apr. 27, 1982

[54] VEHICLE BRAKE SYSTEM
[75] Inventor: Hans-Christof Klein, Hattersheim, Fed. Rep. of Germany
[73] Assignee: ITT Industries, Inc., New York, N.Y.
[21] Appl. No.: 155,827
[22] Filed: Jun. 2, 1980
[30] Foreign Application Priority Data
Jun. 28, 1979 [DE] Fed. Rep. of Germany ....... 2926017
[51] Int. Cl.³ .............................................. B60T 8/08
[52] U.S. Cl. .................................. 364/426; 303/93; 303/108
[58] Field of Search ................... 364/426; 303/93, 94, 303/97, 108; 371/8

[56] References Cited
U.S. PATENT DOCUMENTS

| | | | |
|---|---|---|---|
| 3,519,805 | 7/1970 | Thorne-Booth | 364/426 |
| 3,545,817 | 12/1970 | Yarber | 303/93 |
| 3,556,612 | 1/1971 | Ando | 303/108 |
| 3,829,167 | 8/1974 | Rouf et al. | 303/93 |
| 3,920,278 | 11/1975 | Hirzel et al. | 303/93 |
| 4,131,325 | 12/1978 | Bayliss | 303/93 |
| 4,154,395 | 5/1979 | Fancy | 371/8 |

Primary Examiner—Charles E. Atkinson
Attorney, Agent, or Firm—John T. O'Halloran; Alfred C. Hill

[57] ABSTRACT

The vehicle brake system includes electronic control logic and an electrically controllable pressure modulator for the brake actuating device of each wheel responsive to the output of the control logic. A brake-signal transmitter transmits to the control logic the value of the desired vehicle deceleration and a deceleration responsive device mounted on the vehicle transmits to the control logic the value of the actual vehicle deceleration. The control logic adjusts the brake pressure supplied by each pressure modulator by a signal dependent upon the difference between the desired value and actual value of the vehicle deceleration. The brake system disclosed is an all digital system and is not temperature sensitive. The brake system also includes antiskid capabilities.

36 Claims, 13 Drawing Figures

VEHICLE BRAKE SYSTEM

BACKGROUND OF THE INVENTION

The present invention relates to a vehicle brake system comprising an electrical control logic, an electrically controllable pressure modulator associated with each brake-actuating device, and a brake-signal transmitter having an electrical output signal which is supplied to the control logic.

A vehicle brake system of the aforementioned type is known from German Patent DE-OS No. 2,128,169. The disclosed system includes a control logic the output signals of which control an electric motor of the pressure control unit. The pressure control unit comprises a hydraulic pressure modulator including a piston actuated by the electric motor and having a wheel brake cylinder applying the brake shoes connected to it. The pressure is monitored by a hydraulic-mechanical final control element which influences a first variable ohmic resistor. The brake-signal transmitter includes a second mechanically variable ohmic resistor. The brake pedal which is actuatable in opposition to a spring is mechanically connected with the sliding contact of the second variable ohmic resistor. The control logic includes a Wheatstone bridge in which each variable resistor interconnects with a fixed resistor to form branches which are paralleled to a power source.

The output signal of the control logic is tapped between the points of the variable and fixed resistors. In the inactive state, the final control element signals no pressure, and the brake-signal transmitter issues no signal. The Wheatstone bridge is in a balanced state. When the brake pedal is depressed resulting in the generation of a brake signal, a difference of potential will occur at the Wheatstone bridge and the electric motor serving to modulate the pressure will be actuated. With the pressure increasing, the final control element will change the first ohmic resistor until it is matched to the first fixed ohmic resistor so that the previously unbalanced Wheatstone bridge is again balanced. Then the control logic ceases to issue an output signal, and the pressure build-up in the wheel brake cylinders will be terminated and will remain constant. In such a vehicle brake system, the pressure in the wheel brake cylinders is directly determined by the position of the vehicle's brake pedal, like in a conventional vehicle hydraulic brake system. Thus, each position of the brake pedal corresponds to a specific brake pressure.

It is a disadvantage in this arrangement that the resistors of the Wheatstone bridge are located in different temperature environments. Thus, each variable resistor allocated to the pressure control units is in an environment which, due to operation, is subject to high variations in temperature. In contrast, the variable resistor of the brake-signal transmitter is located in the passenger compartment where it is exposed to a temperature of about 19° C. The control logic is arranged in either the passenger or engine compartment. High differences in temperature as they may occur under adverse operating conditions would thus be the cause of trouble and error signals would be generated by the control device. In addition, false braking and the build-up of different pressures in the individual wheel brake cylinders are conducive to an increased stopping distance and directional instability during braking. Hence, the output signal generated by the brake-signal transmitter depends on the pressure in the wheel brake cylinders, on the one hand, and on the temperature in the first and second variable resistor environments, on the other hand.

SUMMARY OF THE INVENTION

It is an object of the present invention to improve upon the known vehicle brake system, to eliminate trouble and to provide a brake signal which initiates the braking action demanded by the vehicle operator safely and independently of external influences.

A feature of the present invention is the provision of a vehicle brake system comprising: an electronic control unit to provide a control signal; a plurality of electrically controllable pressure modulators each coupled to the control unit and to a different brake actuating device responsive to the control signal for controlling the brake actuating device associated therewith; a brake-signal transmitter coupled to the control unit providing a first signal to the control unit representative of a desired value of vehicle deceleration; and a decelerometer fastened to the vehicle and coupled to the control unit providing a second signal to the control unit representative of the actual value of vehicle deceleration, the control unit providing the control signal dependent on the difference between the first and second signals.

This arrangement ensures that the vehicle is decelerated as desired by the vehicle operator, independent of external temperatures. The direct relationship between brake-pedal position and vehicle deceleration enables the operator to slow down his vehicle safely without major effort.

Because the output signal of the brake-signal transmitter is a digital signal, it is possible to utilize digital control electronics without the necessity of resorting to expensive analog-to-digital converters.

An increased functional safety is ensured by the brake-signal transmitter issuing simultaneously two redundant signals transmitted independently of each other. An error detection can be performed on the basis of the two output signals via the redundancy, permitting a transmission error in the control logic to be detected and possibly eliminated.

Because the brake-signal transmitter includes a pedal having fastened to it a circular segment with radially outwardly extending equidistant teeth of equal width, or a sensor fastened to the pedal and a sensor immovably arranged relative to the pedal, or a circular segment with radially inwardly extending equidistant teeth of equal width, it is possible to provide in a simple manner a pulse train by inductive, capacitive, electrical and/or mechanical-electrical signal generation, the number of pulses reproducing a digital variable corresponding to the desired vehicle deceleration. Further, the advantage of such a signal is the additional information content conveyed by the pulse spacing and the pulse width which are indicative of how rapidly the brake pedal is depressed. Thus, the pressure in the wheel brake cylinders could build up rapidly with the pulse spacing small, and slowly with the pulse spacing wide. A braking operation adapted to the driving situation becomes possible.

Because the tooth distances on the circular segment become less as the circular segment is scanned up to maximum angular departure, the brake pedal travel becomes less at a desired increased deceleration. In spite of this, the initial area remains largely linear so that in this instance the desired deceleration for a normal brake application can be dimensioned with a sufficient amount of precision. In this manner, it is possible to adapt the characteristic of vehicle deceleration against brake pedal travel to the individual requirements by varying the tooth arrangement on the circular segment.

Because the output signal of the brake-signals transmitter is required to exceed a threshold value before the control logic delivers brake commands, an electric dead zone is generated which inhibits undesired low-level output signals possibly produced on the road as a result of clearances of the brake-signal transmitter.

Because the threshold value is assigned a defined hydraulic pressure in the pressure units, prompt application of the brakes and a deceleration thereby commencing is ensured. In this arrangement, the brake shoes will move from a defined normal position ensuring a brake clearance into a defined operating position in which the brake shoes are applied without remaining in an undefined position therebetween. Thus, brake shoe wear can be reduced, resulting in a longer life.

Because each hydraulic pressure unit is assigned a pressure gauge presenting its electrical output signal to the control electronics which prevents a further pressure increase when the hydraulic pressure limit value is attained, the pressure unit is protected against detrimental excess pressures.

In vehicle brake systems including at least one sensor arranged at a vehicle wheel and sensing a variable which is proportional to the wheel rotational velocity and applied to the control logic, it will be advantageous to adjust the hydraulic pressure limit value to the vehicle speed. Thus, a lower hydraulic pressure limit value can be set when the vehicle is at standstill so that the vehicle brake system is not exposed to unnecessarily high pressures.

To improve the pressure proportioning at front and rear axles or wheels, each vehicle axle or vehicle wheel is assigned a dynamometer which measures the static and dynamic load shift and translates it into an electrical variable which is transmitted to the control logic so that the control logic will adjust the pressure in the relevant hydraulic pressure units to an input characteristic. Thus, it can be ensured that the vehicle is brought to a stop in a largely optimum manner without overbraking occurring.

Because the braked wheels are monitored by an antiskid device whose control commands are superior to the control commands of the control logic, an optimum synthesis between a vehicular electric-hydraulic brake system and a conventional brake system which is monitored by an antiskid system is provided. The antiskid system is able to act directly on the pressure-controlling electric motors of the pressure control units. The need for the hydraulic section of a conventional antiskid device is thus obviated.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
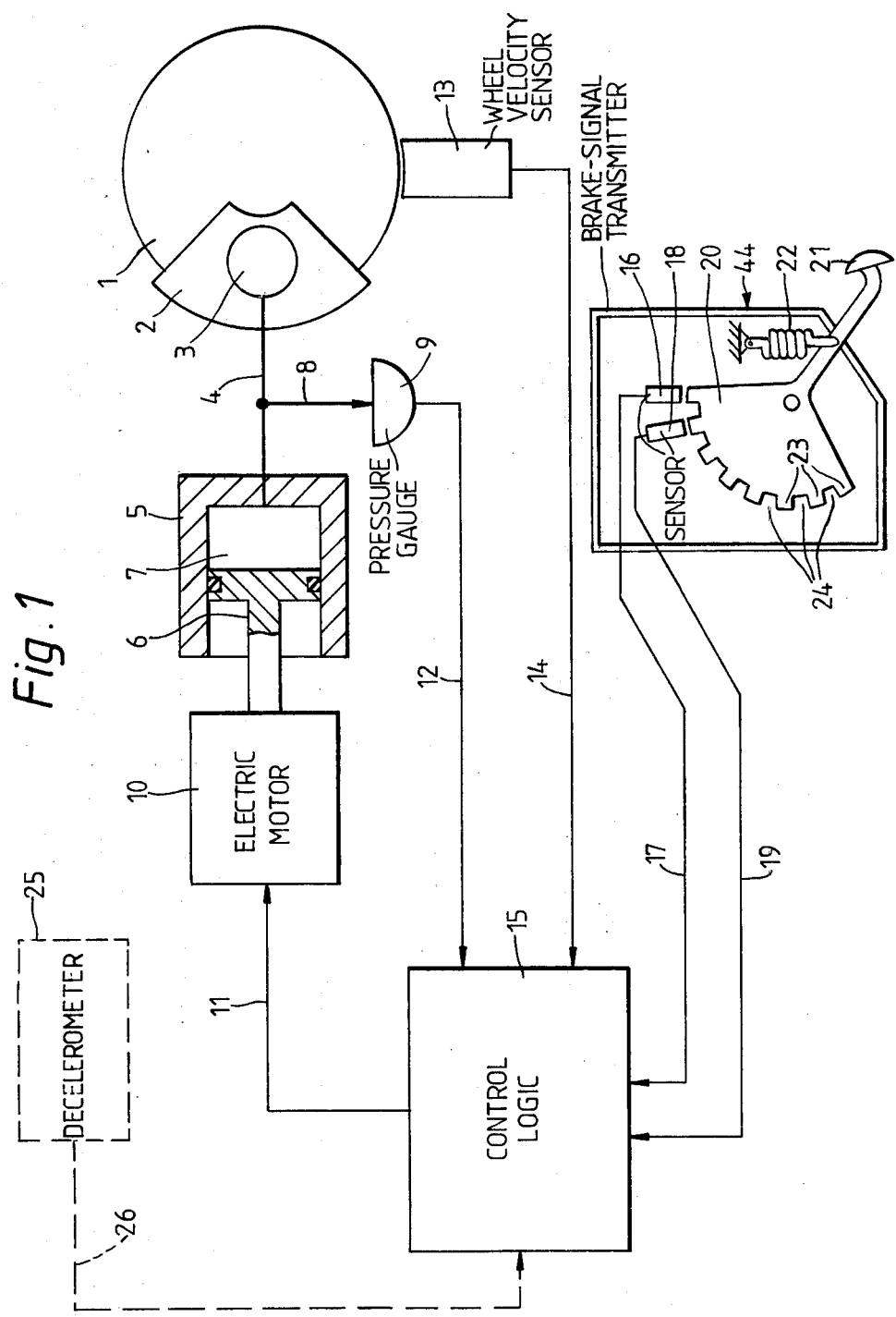
FIG. 1 is a block diagram of a brake system constructed in accordance with the principles of the present invention.

In the brake system of FIG. 1, reference numeral 1 designates the wheel of a vehicle to be decelerated. The brake-actuating device includes an electric motor 10 which axially moves the piston 6 of a pressure modulator 5 via a spindle, for example. Thereby the hydraulic fluid present in pressure chamber 7 is exposed to a force which acts, via pressure line 4, upon wheel cylinder 3 of a disc brake 2 to apply the brake shoes. Via a line 8, the pressure is monitored by pressure gauge 9 which delivers its electrical output signal to a control logic 15 via line 12. Control logic 15 controls via control line 11 electric motor 10 and stops the pressure build-up when the pressure has reached a maximum value.

If it is desired to initiate a braking of wheel 1, brake-signal transmitter 44 is activated. Via a brake pedal 21, a toothed circular segment 20 is passed along two sensors 16 and 18 which sense the passing of a tooth 23. The alternate passing of a tooth 23 and a gap 24 generates in sensors 16 and 18 a pulse train which is delivered to control logic 15 via lines 17 and 19. From the number of pulses counted by digital counters coupled to lines 17 and 19, control logic 15 is able to determine the position of the brake pedal and to use this desired value, which is representative of a desired vehicle deceleration, for the internal servomechanism. This desired vehicle deceleration value is compared by a comparator with an actual vehicle deceleration value which is transmitted to control logic 15 via line 26 from a decelerometer 25 fitted to the vehicle. Thus, the actual vehicle deceleration value signalled represents the second variable required for the servomechanism. By means of the difference between actual and desired value, the braking pressure is controlled by control logic 15 via electric motor 10.

The braking pressure is kept constant with correspondingly accurate approximation to the desired value.

The control logic 15 of this arrangement operates preferably digitally which ensures a very high operating accuracy and suitable speed. By the redundant signal transmission of the desired value, it is thereby also possible to detect, signal and correct an error that might have occurred in the transmission lines 17 and 19.

In order to avoid that the maximum braking pressure is at all times present with the vehicle at a standstill, i.e., with wheel 1 not rotating and the brake applied, a sensor 13 is assigned to wheel 1 which signals an electrical variable proportional to the wheel rotational velocity to control logic 15 via line 14. This permits detection of a standing condition of the vehicle, and the control logic will reduce the maximum brake pressure value so that the pressure applied with the vehicle standing is a multiple less than the predetermined maximum braking pressure.

Because control logic 15 presets a threshold value to the signals of sensors 16 and 18 which has to be overcome first before the control logic responds to the signals arriving from brake-signal transmitter 44, possible error signals are eliminated which may occur as a result of brake-signal transmitter 44 clearances caused by manufacture and operation. This threshold vlaue can be set by a threshold count in the counters coupled to lines 17 and 19.

The components in FIG. 1 shown in dashed lines and representing decelerometer 25 and signal line 26 may also be integrated into control logic 15 because the latter is likewise mounted on the vehicle so that the deceleration acting on control logic 15 is the same as that acting on the vehicle.

The dual-redundant system of brake-signal transmitter 44 may be designed in various ways as shown in FIGS. 2 to 6. It is decisive in this arrangement that the information content of the individual signals on signal lines 17 and 19, i.e., the pedal travel covered by brake pedal 21, is the same. How these signals of sensors 16 and 18 are linked for error detection is irrelevant to the mode of operation and signal generation of brake-signal transmitter 44.

Figure 2A:
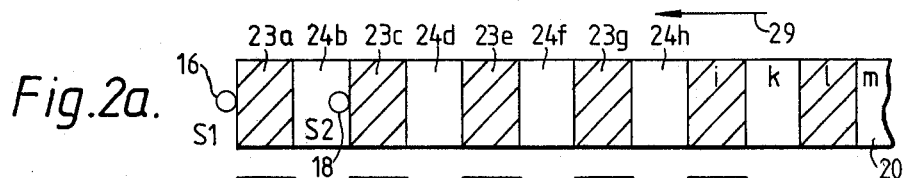
FIGS. 2 to 6 illustrate possible arrangements of the teeth on the circular segment and of the sensors associated therewith for dual-redundant transmission systems, showing the pluse trains generated by the sensors.

In FIG. 2a, sensors 16 and 18 are assigned additional designations S1 and S2, respectively. The teeth and gaps spaced over the periphery of circular segment 20 are assigned reference numerals 23a, 23c, 23e, etc., and 24b, 24d, 24f, ect., respectively. For purposes of simplicity, the description and further Figures will refer to teeth a, c, e, etc., and to gaps b, d, f, etc. only. In FIGS. 2 to 6, circular segment 20 is understood to move past the sensors in the direction of arrow 29. It is, of course, possible to arrange for the sensors to move past the teeth and gaps in opposition to the direction of arrow 29 with circular segment 20 being stationary. The width of the teeth and gaps in the direction of movement relative to the width of the sensors must be chosen such that the sensor does not overlap tooth and gap, or a multiple thereof at a time. The width of tooth and gap is preferably chosen such that the sensor overlaps only one tooth or one gap at a time.

Figure 2B:
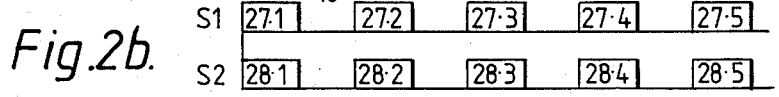

In FIG. 2a, sensors S1 and S2 are spaced in the direction of movement 29 of circular segment 20 at a relative distance which results from the width of tooth and gap. Thus, sensor S1 would receive the first pulse 27.1, as illustrated in the pulse train of FIG. 2b, from tooth a. Sensor S2, on the other hand, would receive the first pulse 28.1 from tooth c. Thus, there results a pulse train corresponding to the tooth arrangement, as shown in FIG. 2b, with pulses 27 and 28 occurring in a congruent relationship to each other and to the brake pedal travel. For example, if tooth a were missing, the first pulse 27.1 from the S1 pulse train would not occur either, and the first pulse 28.1 from the second pulse train S2 would be substituted for the missing pulse 27.1 in control logic 15. A safe signal of brake-signal transmitter 44 is thus ensured.

Figure 2C:
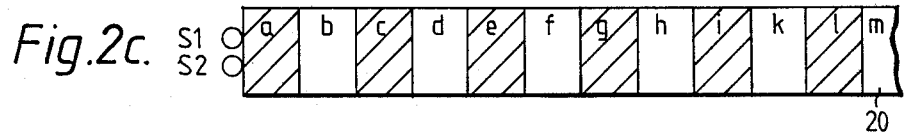

In FIG. 2c, the two sensors S1 and S2 are arranged adjacent to each other at right angles to the direction of movement 29. Thus, sensors S1 and S2 sense the same tooth at the same time. In this arrangement, an error detection could be performed only with respect to the functioning of the individual sensors and the associated signal line. A no-tooth condition results in a no-signal condition.

Figure 3A:
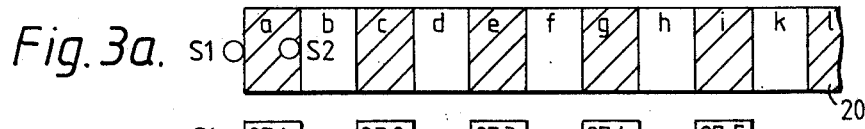
Figure 3B:
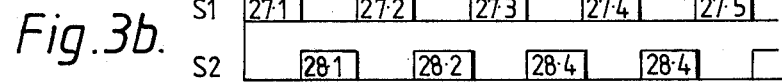

FIG. 3a shows an arrangement of two sensors, with first sensor S1 sensing the leading flank of the first tooth while at the same time second sensor S2 senses the trailing flank of the first tooth. From this ensues a pulse train as shown in FIG. 3b. The first pulse 27.1 of first sensor S1 is generated by tooth a, the first pulse 28.1 of second sensor S2 is generated by tooth c. This arrangement differs from the previous one in the staggered occurrence of pulses 27 relative to pulses 28. According to the sensor arrangement, the leading edge of pulse 28.1 is generated at the time the trailing edge of pulse 27.1 occurs. This means that at the time a pulse is delivered at sensor S1, sensor S2 passes over a gap so that no pulse is issued by it. Thus, the two sensors S1 and S2 alternately issue a pulse defining the brake pedal position.

Figure 4A:
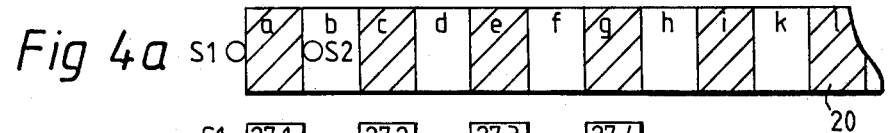
Figure 4B:
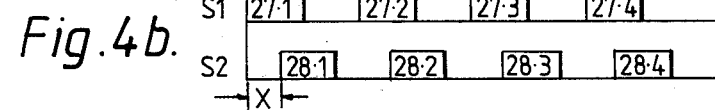

FIGS. 4a and 4b show another arrangement of sensors S1 and Sa in which the pulses issued by them are staggered by amount x. This is due to the fact that sensor S1 senses the leading flank whiles sensor S2 has already sensed the trailing flank and lies with its sensor surface fully above the gap. The first pulse 27.1 of sensor S1 pulse train is generated by tooth a, the first pulse 28.1 of sensor S2 is generated by tooth c.

As shown in FIG. 4b, the pulse train at sensor S1 starts with a pulse and the pulse train at sensor S2 starts with no pulse. Only after a specific distance has been covered which corresponds to the distance between the pulse leading edge and the next tooth c, will sensor S2 deliver a pulse.

Figure 5A:
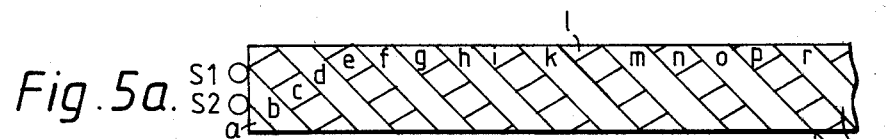
Figure 5B:
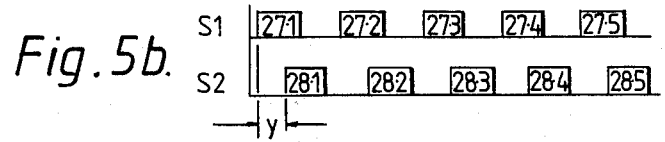

FIGS. 5a and b show another possibility of staggering the pulses of the two sensors S1 and S2. In this arrangement, the toothing is inclined relative to the direction of movement 29 so that the flanks of the teeth do not show the rectangular arrangement relative to the lateral surfaces of circular segment 20 as illustrated in the previous embodiments. In this embodiment, the flanks of the teeth are not at right angles to the lateral surfaces of circular segment 20. In an arrangement of sensors S1 and S2 as is also shown in FIG. 2c, there results that the pulses 27 and 28 delivered are staggered by distance y. As a consequence, distance y is in a direct relationship to angle α provided. If angle α is equal to zero degrees, this embodiment would correspond to that of FIG. 2c with the resultant pulse train being indicated in FIG. 2b. With the angle increasing, the two pulse trains of sensors S1 and S2 will be displaced so that all areas, from synchronously issued pulses at sensors S1 and S2 up to asynchronously issued pulses as shown, for example, in FIG. 3b can be covered.

Figure 6A:
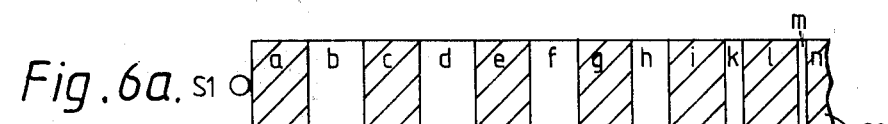
Figure 6B:
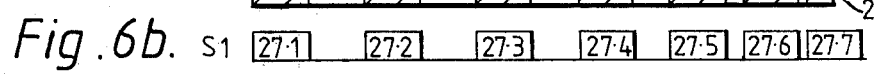

FIG. 6a shows a tooth arrangement in which gaps b, d, f, h, k and m become progressively smaller, with teeth a, c, e, g, i and l, however, being of equal width. If a sensor S1 senses this tooth arrangement, there will result the pulse train shown in FIG. 6b. In this arrangement, pulses 27 will close up progressively so that the pulse train is directly indicative of the position of the brake pedal. This would have the advantage of enabling the output signal of brake-signal transmitter 44 to attain a higher value while the brake pedal travel remains the same. This permits a finer distribution of the desired vehicle deceleration, allowing a better metered braking effect in the first area of the brake pedal.

Figure 7:
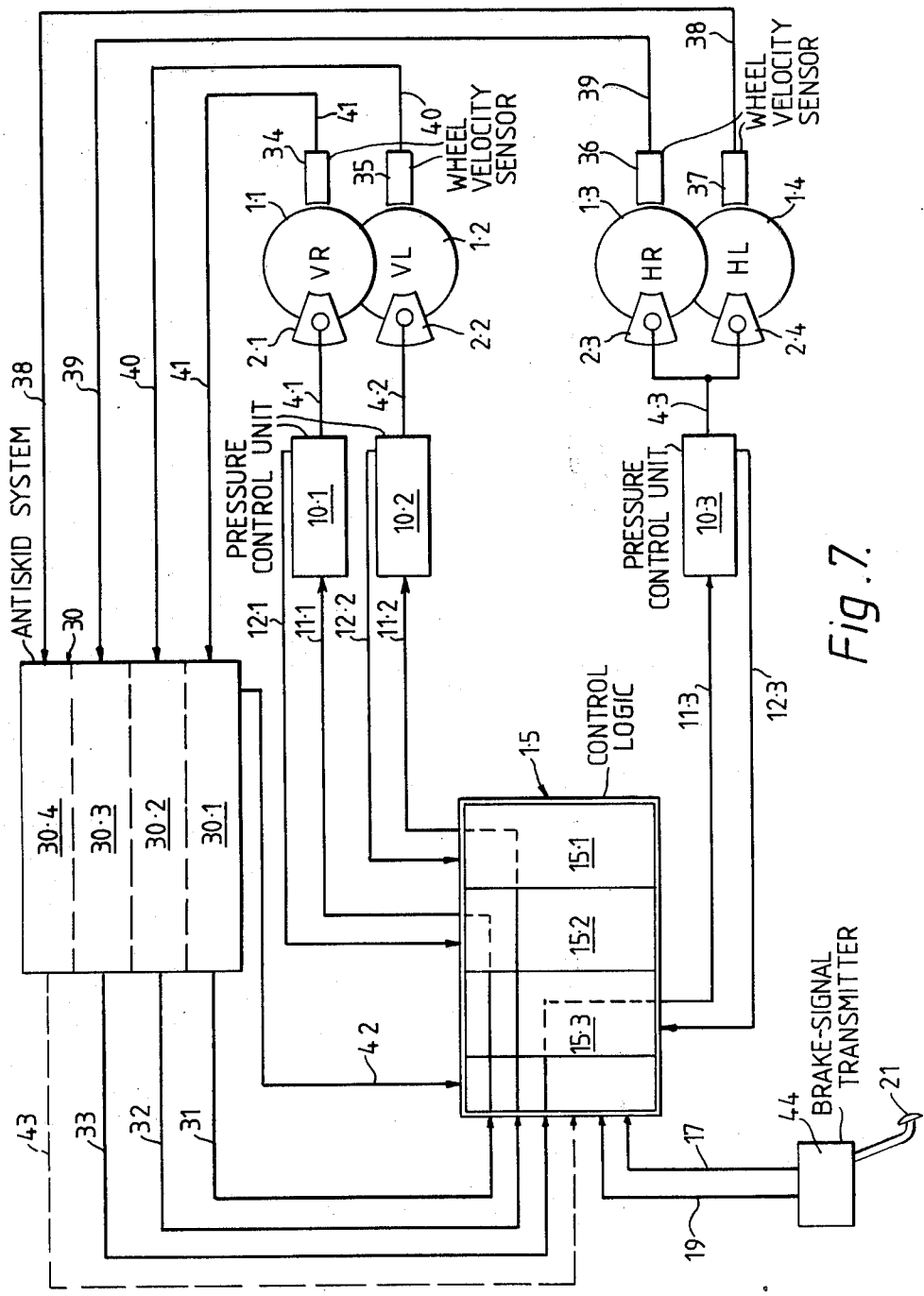
FIG. 7 is a block diagram of a vehicle brake system in accordance with the principles of the present invention having a superior antiskid system.

FIG. 7 shows an embodiment of the present invention incorporating a antiskid system 30. Antiskid system 30 may be any one of a number of different prior art antiskid systems such as disclosed in U.S. Pat. Nos. 3,583,773; 3,744,851; and 3,768,873. The vehicle brake system includes three pressure control units 10.1, 10.2, 10.3, with pressure control unit 10.1 acting on the right-hand front wheel 1.1 through hydraulic pressure line 4.1 and brake unit 2.1, with hydraulic pressure control unit 10.2 acting on the left-hand front wheel 1.2 through pressure line 4.2 and brake device 2.2, whereas pressure control unit 10.3 acts through hydraulic pressure line 4.3 on brake devices 2.3 and 2.4 which decelerate the right-hand rear-wheel 1.3 and the left-hand rear wheel 1.4. The individual pressure control units 10.1 to 10.3 are controlled via separate control units or channels 15.1 to 15.3 in control logic 15 through control lines 11.1 to 11.3. In this arrangement, the output signals of the pressure gauges integrated into pressure control units 10.1 to 10.3 are applied to the individual control units 15.1 to 15.3 through signal lines 12.1 to 12.3. Control unit 15 receives the actuating signal through signal lines 17 and 19 of brake-signal transmitter 44. In this arrangement, brake-signal transmitter 44 is assigned an ergodynamic characteristic which is adapted to the vehicle and/or the vehicle operator. Antiskid system 30 includes four channels or units 30.1 to 30.4.

Through signal lines 38 to 41, each unit 30.1-30.4 is connected to respective sensors 34 to 37 which are assigned respective wheels 1.1 to 1.4. Sensors 34 to 37 transmit to the antiskid system an electrical variable which is proportional to the wheel rotational velocity. From these variables, antiskid system 30 determines an imminent locked condition of the individual wheels and intervenes in the individual control channels 15.1 to 15.3 of control unit 15 through control lines 31 to 33. Thus, antiskid control system 30 has direct access to pressure control units 10.1 to 10.3 without any influence from control logic 15 in order to eliminate the danger of locking of the individual wheels. Antiskid system 30 is directly connected to control logic 15 through a signal line 42 and conveys to it the information on whether or not the vehicle is at a standstill. Hence, control logic 15 is ble to control the pressure prevailing in the individual pressure control unis 10.1–10.3.

As shown in FIG. 7, the rear wheels 1.3 and 1.4 are controlled jointly by pressure control unit 10.3. Hence, it results that control logic 15 for these two rear wheels requires only one control channel 15.3, and antiskid system 30 only one monitor channel 30.3. As is conventional practice in antiskid devices, the signals from the two sensors 36 and 37 are linked such that an optimum braking pressure is applied to both wheels 1.3 and 1.4. However, if the four-channel antiskid system 30 shown is extended further, a control line 43 permits access to another channel of control logic 15 so that a separate four-channel control is provided.

While I have described above the principles of my invention in connection with specific apparatus, it is to be clearly understood that this description is made only by way of example and not as a limitation to the scope of my invention as set forth in the objects thereof and in the accompanying claims.

I claim:
1. A vehicle brake system comprising:
   an electronic control unit to provide a control signal;
   a plurality of electrically controllable pressure modulators each coupled to said control unit and to a different brake actuating device responsive to said control signal for controlling said brake actuating device associated therewith;
   a brake pedal actuated brake-signal transmitter coupled to said control unit providing a first signal to said control unit representative of a desired value of vehicle deceleration; and
   a decelerometer fastened to said vehicle and coupled to said control unit providing a second signal to said control unit representative of the actual value of vehicle deceleration, said control unit providing said control signal dependent on the difference between said first and second signals.

2. A system according to claim 1, wherein said first signal is a digital signal.
3. A system according to claim 2, wherein said transmitter provides simultaneously two of said first signals independent of one another.
4. A system according to claim 3, wherein said transmitter includes
   a circular segment having teeth extending therefrom,
   a sensor disposed relative to said teeth to generate said first signal upon relative movement of said teeth and said sensor, and
   one of said segment and said sensor being fixed and the other of said segment and said sensor being movable by said brake pedal to provide said relative movement.
5. A system according to claim 4, wherein the width of a gap between adjacent ones of said teeth decreases as said segment is displaced up to a maximum angular displacement.
6. A system according to claim 4, wherein said first signal must exceed a threshold value before said control unit provides said control signal.
7. A system according to claim 6, wherein said threshold value corresponds to a predetermined hydraulic pressure in said pressure modulators.
8. A system according to claim 7, further including a pressure gauge coupled to the output of each of said pressure modulators and said control unit to provide a third signal to said control unit to prevent a further pressure increase when said modulators provide a hydraulic pressure equal to a given pressure limit.
9. A system according to claim 8, further including a wheel velocity sensor associated with at least one wheel of said vehicle and said control unit to provide a fourth signal proportional to wheel rotational velocity as an input to said control unit to enable adjustment of said given pressure limit to vehicle speed.
10. A system according to claim 9, further including an antiskid system coupled to said velocity sensor and an associated one of said plurality of modulators through said control unit to monitor braking of said wheels, control commands from said antiskid system having precedence over said control signal of said control unit.
11. A system according to claim 1, wherein said transmitter provides simultaneously two of said first signal independent of one another.
12. A system according to claim 11, wherein said transmitter includes
   a circular segment having teeth extending therefrom,
   a sensor disposed relative to said teeth to generate said first signal upon relative movement of said teeth and said sensor, and
   one of said segment and said sensor being fixed and the other of said segment and said sensor being movable by said brake pedal to provide said relative movement.
13. A system according to claim 12, wherein the width of a gap between adjacent ones of said teeth decreases as said segment is displaced up to a maximum angular displacement.
14. A system according to claim 12, wherein said first signal must exceed a threshold value before said control unit provides said control signal.

15. A system according to claim 14, wherein said threshold value corresponds to a predetermined hydraulic pressure in said pressure modulators.

16. A system according to claim 15, further including a pressure gauge coupled to the output of each of said pressure modulators and said control unit to provide a third signal to said control unit to prevent a further pressure increase when said modulators provide a hydraulic pressure equal to a given pressure limit.

17. A system according to claim 16, further including a wheel velocity sensor associated with at least one wheel of said vehicle and said control unit to provide a fourth signal proportional to wheel rotational velocity as an input to said control unit to enable adjustment of said given pressure limit to vehicle speed.

18. A system according to claim 17, further including an antiskid system coupled to said velocity sensor and an associated one of said plurality of modulators through said control unit to monitor braking of said wheels, control commands from said antiskid system having precedence over said control signal of said control unit.

19. A system according to claim 1, wherein said transmitter includes
a circular segment having teeth extending therefrom,
a sensor disposed relative to said teeth to generate said first signal upon relative movement of said teeth and said sensor, and
one of said segment and said sensor being fixed and the other of said segment and said sensor being movable by said brake pedal to provide said relative movement.

20. A system according to claim 19, wherein the width of a gap between adjacent ones of said teeth decreases as said segment is displaced up to a maximum angular displacement.

21. A system according to claim 19, wherein said first signal must exceed a threshold value before said control unit provides said control signal.

22. A system according to claim 21, wherein said threshold value corresponds to a predetermined hydraulic pressure in said pressure modulators.

23. A system according to claim 22, further including a pressure gauge coupled to the output of each of said pressure modulators and said control unit to provide a third signal to said control unit to prevent a further pressure increase when said modulators provide a hydraulic pressure equal to a given pressure limit.

24. A system according to claim 23, further including a wheel velocity sensor associated with at least one wheel of said vehicle and said control unit to provide a fourth signal proportional to wheel rotational velocity as an input to said control unit to enable adjustment of said given pressure limit to vehicle speed.

25. A system according to claim 24, further including an antiskid system coupled to said velocity sensor and an associated one of said plurality of modulators through said control unit to monitor braking of said wheels, control commands from said antiskid system having precedence over said control signal of said control unit.

26. A system according to claim 1, wherein said first signal must exceed a threshold value before said control unit provides said control signal.

27. A system according to claim 26, wherein said threshold value corresponds to a predetermined hydraulic pressure in said pressure modulators.

28. A system according to claim 27, further including a pressure gauge coupled to the output of each of said pressure modulators and said control unit to provide a third signal to said control unit to prevent a further pressure increase when said modulators provide a hydraulic pressure equal to a given pressure limit.

29. A system according to claim 28, further including a wheel velocity sensor associated with at least one wheel of said vehicle and said control unit to provide a fourth signal proportional to wheel rotational velocity as an input to said control unit to enable adjustment of said given pressure limit to vehicle speed.

30. A system according to claim 29, further including an antiskid system coupled to said velocity sensor and an associated one of said plurality of modulators through said control unit to monitor braking of said wheels, control commands from said antiskid system having precedence over said control signal of said control unit.

31. A system according to claim 1, further including a pressure gauge coupled to the output of each of said pressure modulators and said control unit to provide a third signal to said control unit to prevent a further pressure increase when said modulators provide a hydraulic pressure equal to a given pressure limit.

32. A system according to claim 31, further including a wheel velocity sensor associated with at least one wheel of said vehicle and said control unit to provide a fourth signal proportional to wheel rotational velocity as an input to said control unit to enable adjustment of said given pressure limit to vehicle speed.

33. A system according to claim 32, further including an antiskid system coupled to said velocity sensor and an associated one of said plurality of modulators through said control unit to monitor braking of said wheels, control commands from said antiskid system having precedence over said control signal of said control unit.

34. A system according to claim 1, further including a wheel velocity sensor associated with at least one wheel of said vehicle and said control unit to provide a fourth signal proportional to wheel rotational velocity as an input to said control unit to enable adjustment of said given pressure limit to vehicle speed.

35. A system according to claim 34, further including an antiskid system coupled to said velocity sensor and an associated one of said plurality of modulators through said control unit to monitor braking of said wheels, control commands from said antiskid system having precedence over said control signal of said control unit.

36. A system according to claim 1, further including an antiskid system coupled to said plurality of modulators through said control unit responsive to wheel velocity signals to monitor braking of wheels of said vehicle, control commands from said antiskid system having precedence over said control signal of said control unit.

* * * * *